US008775520B1

(12) United States Patent
Lewis et al.

(10) Patent No.: US 8,775,520 B1
(45) Date of Patent: Jul. 8, 2014

(54) SYSTEMS AND METHODS FOR VIEWING NON-HTML EMAIL ATTACHMENTS

(75) Inventors: Darren Lewis, Mountain View, CA (US); Stephanie K. Hannon, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1756 days.

(21) Appl. No.: 11/241,699

(22) Filed: Sep. 30, 2005

(51) Int. Cl.
G06F 15/16 (2006.01)
H04L 12/58 (2006.01)

(52) U.S. Cl.
CPC .............. *H04L 51/08* (2013.01); *H04L 12/58* (2013.01); *H04L 51/00* (2013.01)
USPC ........................................................ 709/206

(58) Field of Classification Search
CPC ................ H04L 51/08; H04L 12/58
USPC .................................... 709/203, 206
See application file for complete search history.

(56) References Cited

U.S. PATENT DOCUMENTS

| 5,208,748 | A | 5/1993 | Flores et al. ........................ 704/1 |
| 5,216,603 | A | 6/1993 | Flores et al. ........................ 704/1 |
| 5,613,108 | A | 3/1997 | Morikawa ........................ 393/616 |
| 5,734,837 | A | 3/1998 | Flores et al. ........................ 705/7 |
| 5,948,058 | A | 9/1999 | Kudoh et al. .................... 709/206 |
| 6,092,114 | A * | 7/2000 | Shaffer et al. .................. 709/232 |
| 6,185,551 | B1 | 2/2001 | Birrell et al. ........................ 707/3 |
| 6,188,405 | B1 | 2/2001 | Czerwinski et al. |
| 6,839,741 | B1 * | 1/2005 | Tsai .............................. 709/217 |
| 7,028,075 | B2 | 4/2006 | Morris |
| 7,099,860 | B1 | 8/2006 | Liu et al. |
| 7,809,383 | B2 | 10/2010 | Rybak et al. |
| 2002/0016818 | A1* | 2/2002 | Kirani et al. .................... 709/203 |
| 2002/0059347 | A1 | 5/2002 | Shaffer et al. |
| 2002/0059383 | A1* | 5/2002 | Katsuda ........................ 709/206 |
| 2003/0055907 | A1* | 3/2003 | Stiers .......................... 709/206 |
| 2003/0084106 | A1 | 5/2003 | Erev et al. |

(Continued)

FOREIGN PATENT DOCUMENTS

WO  WO 00/23931  4/2000

OTHER PUBLICATIONS

Bellotti, V et al., (2003), "Taking Email to Task: the design and evaluation of a task management centered email tool." In Conference Proceedings on Human Factors in Computing Systems (CHI2003), pp. 345-352, Apr. 5-10, 2003, Fort Lauderale, Florida.

(Continued)

*Primary Examiner* — Hee Soo Kim
(74) *Attorney, Agent, or Firm* — Morgan, Lewis & Bockius LLP

(57) ABSTRACT

A method of displaying attachments associated with an electronic message displays an electronic message in a first instance of a client application (e.g., a web browser) running on a client computer. The electronic message includes one or more attachment viewing links, each link corresponding to an attachment associated with the electronic message and each attachment having a particular document type. After a single user selection of one of the attachment viewing links, a converted document (e.g., an HTML file) is transferred from a document storage system to the client computer. The converted document corresponds to one of the attachments associated with the message and the converted document has a document type different from the document type of the attachment. The converted document is displayed in a second instance of the client application.

30 Claims, 13 Drawing Sheets

(56) References Cited

U.S. PATENT DOCUMENTS

| | | | |
|---|---|---|---|
| 2003/0101413 A1 | 5/2003 | Klein et al. | |
| 2003/0182331 A1 | 9/2003 | Demsky et al. | |
| 2003/0208546 A1* | 11/2003 | DeSalvo et al. | 709/206 |
| 2003/0233419 A1 | 12/2003 | Beringer | 709/206 |
| 2003/0234953 A1 | 12/2003 | Dawson et al. | |
| 2004/0066421 A1 | 4/2004 | Kameyama | |
| 2004/0133564 A1* | 7/2004 | Gross et al. | 707/3 |
| 2004/0143564 A1* | 7/2004 | Gross et al. | 707/1 |
| 2004/0143569 A1* | 7/2004 | Gross et al. | 707/3 |
| 2004/0143650 A1 | 7/2004 | Wollowitz | |
| 2004/0158340 A1 | 8/2004 | Fischer et al. | |
| 2004/0158607 A1 | 8/2004 | Coppinger et al. | |
| 2004/0172451 A1 | 9/2004 | Biggs et al. | |
| 2004/0210845 A1 | 10/2004 | Paul et al. | |
| 2004/0215696 A1 | 10/2004 | Fisher et al. | |
| 2005/0144241 A1* | 6/2005 | Stata et al. | 709/206 |
| 2006/0075046 A1 | 4/2006 | Yozell-Epstein et al. | |
| 2006/0133340 A1 | 6/2006 | Rybak et al. | |
| 2006/0136420 A1* | 6/2006 | Gandhi et al. | 707/9 |
| 2006/0167940 A1 | 7/2006 | Colton et al. | |
| 2007/0061308 A1 | 3/2007 | Hartwell et al. | |
| 2007/0091746 A1* | 4/2007 | Brunet et al. | 369/47.12 |
| 2008/0005247 A9 | 1/2008 | Khoo | |

OTHER PUBLICATIONS

Bellotti, V. et al., "Taskmaster: recasting email as task management," PARC, CSCW '02 Workshop on Redesigning Email for the 21st Century.

Comer, D. and Peterson, L., "Conversion-Based Mail," ACM Transactions on Computer Systems (TOCS) vol. 4, Issue 4, pp. 299-319, Nov. 1986.

Flores, F. et al., "Computer Systems and the design of organizational interaction," ACM Transactions on Information Systems., pp. 153-172, (1988).

Shepherd, A. et al., "Strudel-an extensible electronic conversation toolkit," Proceedings of the 1990 ACM Conference on Computer-supported Cooperative Work, Los Angeles, California, United States, pp. 93-104.

Venolia, G., et al., "Supporting Email Workflow,"Technical Report MSR-TR-2001-88, Microsoft Corporation, 10 pages (Sep. 2001).

Winograd, T., (1987), "A language/action perspective on the design of cooperative work," Human-Computer Interaction, vol. 3 No. 1, pp. 3-30, (1987-1988). Earlier version presented at the Conference on Computer-supported Cooperative Work, Austin, pp. 203-220, Dec. 1986.

Winograd, T., "Where the Action is," pp. 256A-260, Byte, Dec. 1988.

Zawinski, J., "Message Threading," http://www.jwz.org/doc/threading.html, pp. 1-9 (1997-2000).

* cited by examiner

US 8,775,520 B1

SYSTEMS AND METHODS FOR VIEWING NON-HTML EMAIL ATTACHMENTS

TECHNICAL FIELD

The disclosed embodiments relate generally to providing information to computer users, and in particular, to allowing computer users to view non-HTML email attachments using a client application.

BACKGROUND

Web browser-based email services are widely used for communicating information over the Internet. Besides the information in its message body, an email message often includes attachments of various document types. These attachments provide a recipient of the email message additional information in connection with the message body. To view the content of an attachment, the recipient of the email message typically downloads the attachment to a client computer and then launches a native application program to open the attachment because web browser-based email services are typically unable to display email message attachments other than HTML, text and image attachments within a web browser window. This traditional approach to viewing email message attachments is inconvenient, because downloading the attachment and launching the application are often time consuming operations. In addition, if the client computer does not have an application program to open the attachment, the message recipient is unable to view the attachment, even if it is successfully downloaded to the client computer.

SUMMARY OF EMBODIMENTS

According to some embodiments, a method of displaying attachments associated with an electronic message displays an electronic message in a first instance of a client application (e.g., a web browser) running on a client computer. The displayed electronic message includes one or more attachment viewing links, each link corresponding to an attachment associated with the electronic message and each attachment having a particular document type. After a single user selection of one of the attachment viewing links, a converted document (e.g., an HTML file) is transferred from a document storage system to the client computer. The converted document corresponds to one of the attachments associated with the message and has a document type different from the document type of the attachment. The converted document is displayed in a second instance or second window of the client application.

BRIEF DESCRIPTION OF THE DRAWINGS

For a better understanding of the nature and embodiments of the invention, reference should be made to the Description of Embodiments below, in conjunction with the following drawings in which like reference numerals refer to corresponding parts throughout the figures.

DESCRIPTION OF EMBODIMENTS

Figure 1:
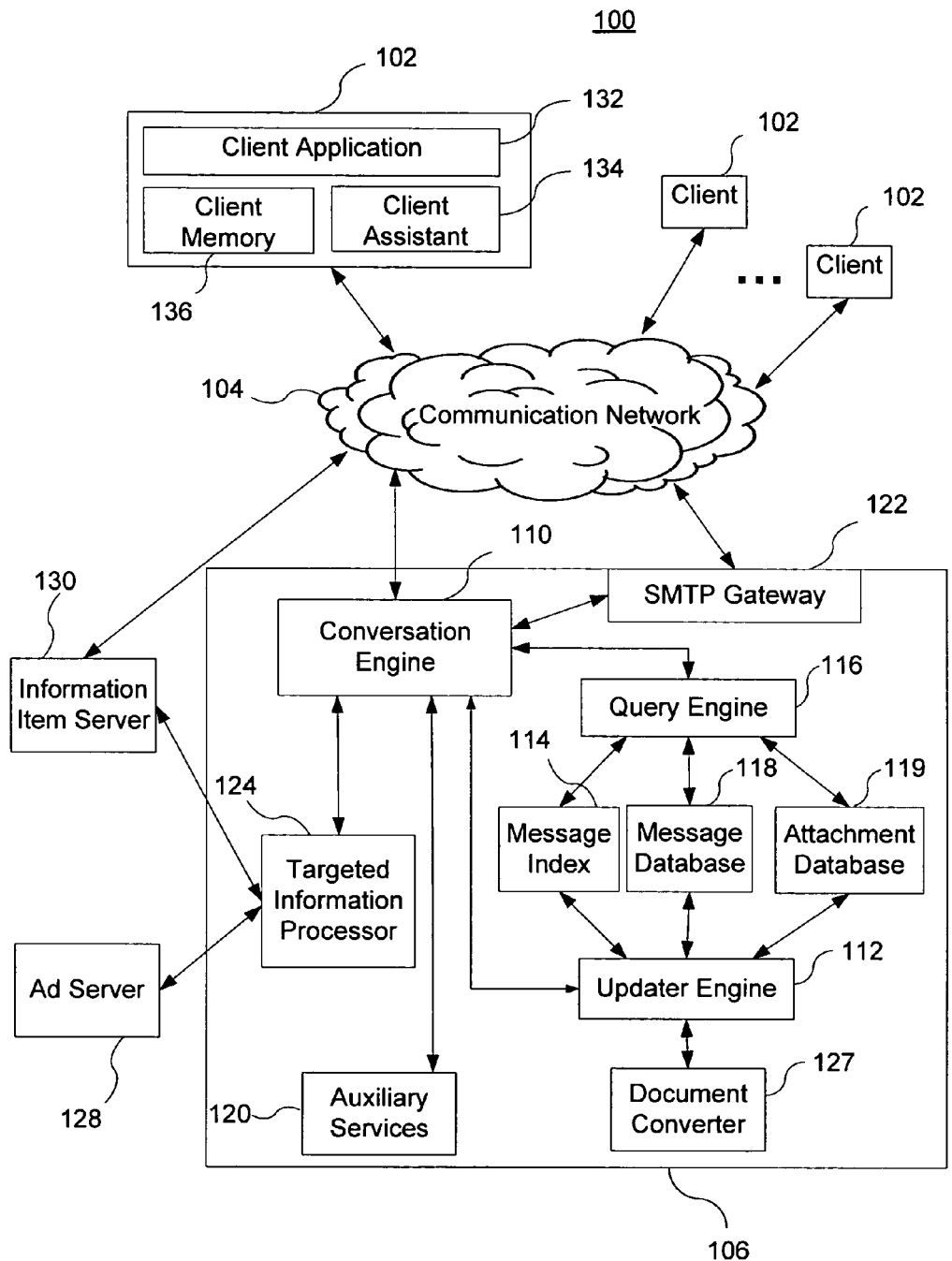
FIG. 1 is a block diagram of an exemplary environment that allows clients to view both email messages and associated attachments in accordance with some embodiments of the present invention.

FIG. 1 is a block diagram of a system 100 for implementing some embodiments of the invention. One or more clients 102 can be connected to a communication network 104. The communication network 104 can be connected to an email service 106. The email service 106 can include a conversation engine 110, an updater engine 112, a message index 114, a query engine 116, a message database 118, a message attachment database 119, a document converter 127, one or more auxiliary services servers 120, an SMTP gateway 122, and a targeted information processor 124. The targeted information processor 124 can be connected to an ad server 128 and/or one or more information item servers 130.

The client 102 can be any of a number of devices (e.g., a computer, an internet kiosk, a personal digital assistant, a cell phone, a gaming device, a desktop computer, or a laptop computer) and can include a client application 132, a client assistant 134, and/or client memory 136. The client application 132 can be a software application that permits a user to interact with the client 102 and/or network resources to perform one or more tasks. For example, the client application 132 can be a browser (e.g., Firefox) or other type of application that permits a user to search for, browse, and/or use resources (e.g., web pages and web services) on the client 102 and/or accessible via the communication network 104. The client assistant 134 can perform one or more tasks related to a user's activities with respect to the client application 132, such as processing information received from or being sent to email service 106. The client assistant 134 can be part of the client application 132, a plug-in to the client application 132 (provided, for example, from various on-line sources), or it may be a stand-alone program. The client assistant 134 can be a web-based messaging application such as the client executable portion of the Google Gmail product. Client memory 136 can store system information, information about a user, as well as files and other data structures.

The communication network 104 may be a wireless, optical, wired or other type of network that facilitates the passage of information. It may include the Internet, one or more local area networks (LANs), one or more wide area networks (WANs), other types of networks, or a combination of such networks.

The term "resource" as used in this document refers to any piece of information or service that is accessible via a Uniform Resource Locator (URL) and can be, for example, a web page, a document, an electronic message, a database, an image, or a computational object. An electronic message includes, but is not limited to, an email message, an Instant Messaging (IM) message, a Short Message Service (SMS) message, and a transcribed voice message. The terms "electronic message", "email message" and "message" are used interchangeably in this document.

The conversation engine 110 can respond to a variety of requests from the client assistant 134 related to messages and return conversation-based responses via its connection with the communication network 104. A conversation may include one or more relevant messages relating to a conversation topic. Various criteria can be used to determine which messages are parts of each distinct conversation. For example, an analysis can be made of the contents of messages received and/or sent by a user. Messages whose contents are found to be related can be grouped together. In another example, a conversation identifier found in a message header can also be used to identify related messages. In a further example, a subject line in the message header can be used to identify related messages. The senders and recipients of the messages are participants in the conversation. All messages directed to a user of the email service 106 can be grouped into a plurality of conversations and presented to the user in a conversation-based format, individually or jointly. In a conversation list view, a user can see in a summary form a list of conversations in which the user participates. In a conversation view, the user can see in an expanded form one or more messages associated with a particular conversation.

The email service 106 can create a snippet of a conversation or a message. A snippet provides a user with a preview of the contents of the conversation or message without the user having to open the conversation or the message. In a list of conversations, the snippet can be generated from the most recent message in the conversation. The snippet can also be extracted from the first message (i.e., the oldest message) in the conversation. The snippet can also be extracted from all the messages in the conversation according to predefined heuristic rules, e.g., listing a set of keywords appearing most frequently in the conversation. If the email service 106 is preparing a list of conversations in response to a search submitted by a user, the email service 106 can create a snippet for each conversation in the list. For each conversation in a displayed portion of the list, the snippet may include a highlighted portion of the conversation that matches user-submitted query terms. These snippets may be similar in one or more respects to snippets included in search results returned by a search engine, such as the Google search engine. In a conversation view, a snippet can be generated for one or more messages in the conversation.

The SMTP gateway 122 is also connected to the communication network 104. The SMTP gateway 122 can be directly involved in receiving and sending messages between the email service 106 and other email systems, messaging systems or email services. In some embodiments, the SMTP gateway 122, for example, transmits and receives messages using the simple mail transfer protocol (SMTP). The SMTP gateway 122 can receive a new message from the communication network 104 and send the message to conversation engine 110 for additional processing. Additionally, the SMTP gateway 122 can receive messages from the conversation engine 110 and then transmit (via the communication network 104) those messages to recipient addresses specified in the headers of the messages.

The one or more auxiliary services servers 120 can provide additional services to the conversation engine 110. The auxiliary services servers 120 can, for example, include a spam detection module for detecting and processing spam and/or an attachment management module for managing the storage and retrieval of documents attached to messages.

As described above, the conversation engine 110 can be connected to the targeted information processor 124. The targeted information processor 124 can provide targeted information for display to a user at client 102. The targeted information processor 124 can provide, for example, advertisements and/or other information items related to the user's messages processed by the conversation engine 110. In some embodiments, the messages include not only messages received by the user but also messages authored and sent by the user. Advertisements are herein defined to include information items, or links to information items, that offer or promote products, services, events, companies, organizations, ideas or the like.

FIG. 1 is exemplary. In some embodiments, the email service 106 contains a subset or superset of those elements illustrated in the figure. Although FIG. 1 shows the email service 106 as a number of discrete elements, this figure is intended more as a functional description of the various features which may be present in the email service 106 than as a structural schematic of the various embodiments. In practice, and as recognized by those of ordinary skill in the art, some elements shown separately could be combined and some elements could be further divided into sub-elements or parallel elements. For example, some separate elements in the figure could be implemented by a single server or module and some single elements could be implemented by one or more servers or modules. The actual number of servers in email service 106 and how features are allocated among the servers will vary from one implementation to another, and may depend in part on the amount of traffic that the system must handle during peak usage periods as well as during average usage periods. For example, the message index 114, the message database 118 and the attachment database 119 can be implemented using a plurality of servers if the email service 106 manages a large volume of messages and attachments associated with a large number of user accounts.

As described above, the client 102 (also herein called the client computer or device) can include client application 132 and client assistant 134. Client application 132 can provide a window to be displayed on a displaying device (e.g., a monitor) for rendering conversations associated with a particular user. The conversations and messages in the conversations can be encoded using HyperText Markup Language (HTML), XML, or any other appropriate markup language or encoding scheme, and then rendered by the client application 132. When a user submits a request through client application 132 to the email service 106 to access messages and attachments stored in the user's account, the email service 106 identifies corresponding conversations in the user's account in accordance with the user's request and transfers them as well as a set of display instructions back to the client 102. Client assistant 134 can, in response, generate one or more forms in accordance with the display instructions, where each form can include information of some of the conversations. The forms can then be submitted to and rendered by client application 132. In another embodiment, client assistant 134 may alternatively exist and operate in the email service 106.

The email service 106 and client assistant 134 work in concert to allow a user to view, compose, send and/or search messages and associated attachments in the user's message account and to present the search results in a highly intuitive fashion. The email service 106 extracts information from a user's message account by processing messages received, sent and/or being composed by the user, and the client assistant 134 assists in rendering the information prepared by the email service 106. In other embodiments a different division of duties between the email service 106 and the client assistant 134 can be implemented. Because many of the tasks performed by the system can be performed by either the email service 106 or the client assistant 134 or by the two working together, these two components are sometimes herein referred to jointly as the "conversation system".

The conversation system can provide at least two different views, including a conversation list view and a conversation view as mentioned briefly above. In a conversation list view, a plurality of conversations can be displayed where each conversation can be displayed in a summary form. For example, each conversation can be represented by a number of conversation elements. The conversation elements can include one or more of: a number indicating the number of messages in the conversation, a list of one or more of the identifiers or names of the senders of messages in the conversation, a conversation description (e.g., a subject line of the message), a date/time value of the conversation (e.g., a date/time value of the last received message in the conversation), and a snippet from one or more of the messages in the conversation. In one approach, each conversation can be represented as a single row in the conversation list view.

In a conversation view, one or more messages from a conversation can be displayed. Each message can be displayed in one of a number of various modes, for example an expanded mode, a compacted mode, or a compressed mode. In an expanded mode, the body of the message can be displayed along with, for example, message header information including names or other identifiers of the sender and the recipients of the message, a date/time value indicative of when the message was received or sent, routing information, and other properties of the message. An expanded mode can be used, for example, for messages which are marked as "unread." In a compacted mode, the message body can be hidden and a snippet from the message is provided in its place. The snippet can be chosen to occupy less space than the body. For example, a snippet can be chosen to occupy only one line in a display window. The compacted mode can be used for messages which have been read or marked as read. The compacted mode allows messages in a conversation to be displayed within the same window more densely than if the expanded mode were used. In a compressed mode, a message can be represented with a small bar. The small bar can contain no message information. The visual effect of such a mode can be that multiple compressed messages appear like the edges of cards in a deck of cards. A user can toggle between the various display modes by selecting a message or using various controls in the display window. It should be understood that the techniques described in this specification with reference to a conversation (as might be found in the Google Gmail product) can be equally used with any message system (e.g., Outlook or Thunderbird) where messages and associated attachments can be displayed in various views (and can include portions of messages) such as a message view or a thread view where related messages can be displayed. For additional information concerning the conversation engine, the conversation list and conversation view modes of operation, see U.S. patent application Ser. No. 10/816,428, filed Mar. 31, 2004, entitled "Displaying Conversations Relevant to a Search Query in a Conversation-Based Email System," which is hereby incorporated by reference.

In some embodiments, when a conversation is being displayed in the conversation view, additional, targeted information (sometimes herein called "informational items") can be displayed in the display window. For example, one or more advertisements relevant to, or related to, one or more of the messages and their associated attachments in the conversation can be displayed. In another example, one or more other types of information can be displayed. Such other information can include, but is not limited to, news items or links to news items, map links, phone numbers, links to product information, stock prices or links to stock prices, links to weather forecasts, web page links, dictionary entries or links to dictionary entries, images or links to images, RSS feeds or links to RSS feeds, links to blog (web log) events, links to user polls, links to files or other content on the client 102, and other types of information.

When an expanded message displayed in a conversation view has one or more attachments, a region in the display window, e.g., the bottom of the message body, is usually reserved for providing information related to the attachments. The attachment information may include a document type icon, a document name, a document size and an attachment downloading link for each attachment. The document type icon suggests the document type of an attachment such as Adobe System's portable document format (PDF) or Microsoft Corporation's PowerPoint (PPT). Sometimes, the document type icon may shed some light on the content of the attachment. For example, a PPT document type icon suggests that the attachment is probably a PowerPoint presentation. The document type icon may also suggest to the user the native application program required to open the downloaded attachment. The document size, together with the network's data transmission rate, determines the attachment downloading time, i.e., how long it takes to download an attachment from the email service 106 to the client 102.

As described above, the email attachments may include additional information related to the message body. In some cases, however, the message body may provide little or no information while an attachment to the same email message may contain substantially more information than the message body. In such cases, the message body itself provides little, if any, clue that can be relied upon to identify targeted information. But the attachment may provide more information that would be useful for identifying targeted information to be displayed along with the message.

Figure 2A:
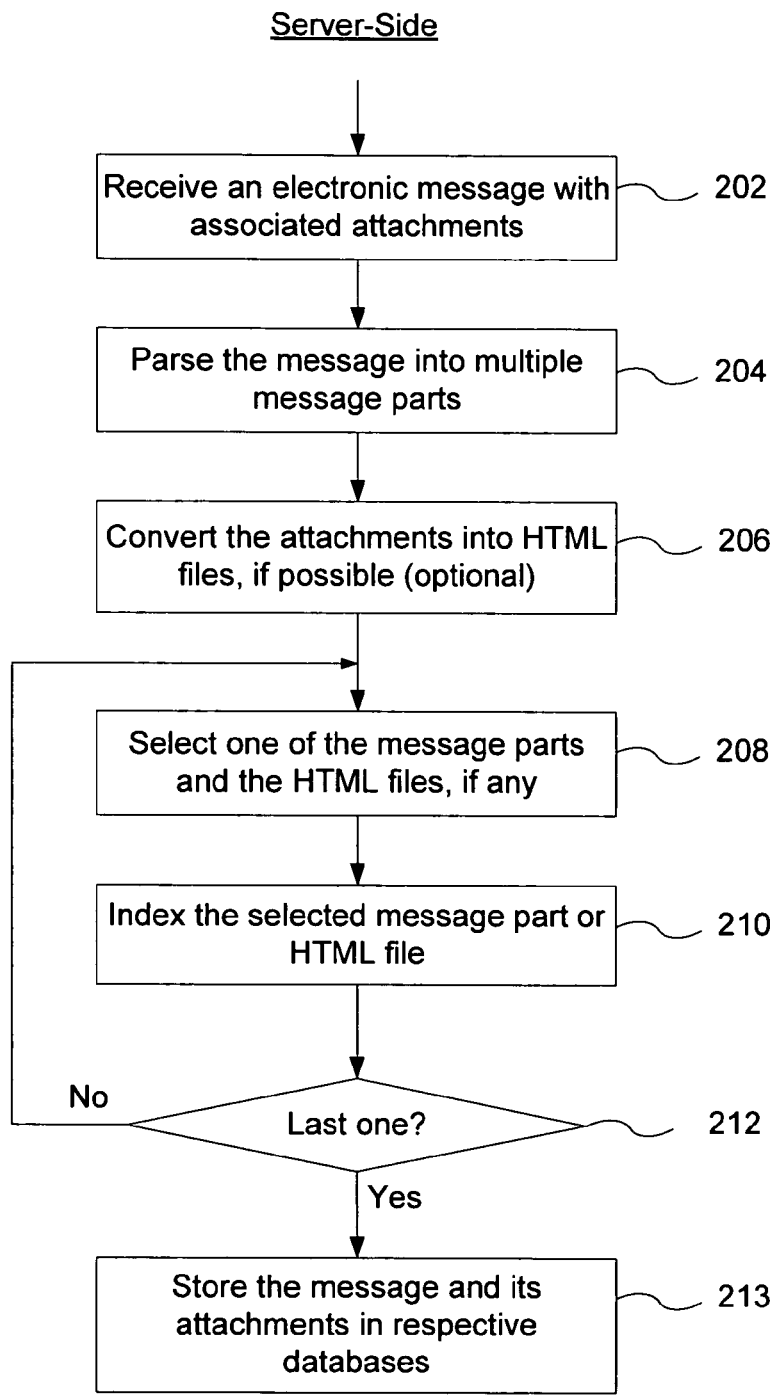
FIG. 2A is a flow diagram of a process of parsing and indexing an incoming electronic message and its associated attachments in accordance with some embodiments of the present invention.
Figure 2B:
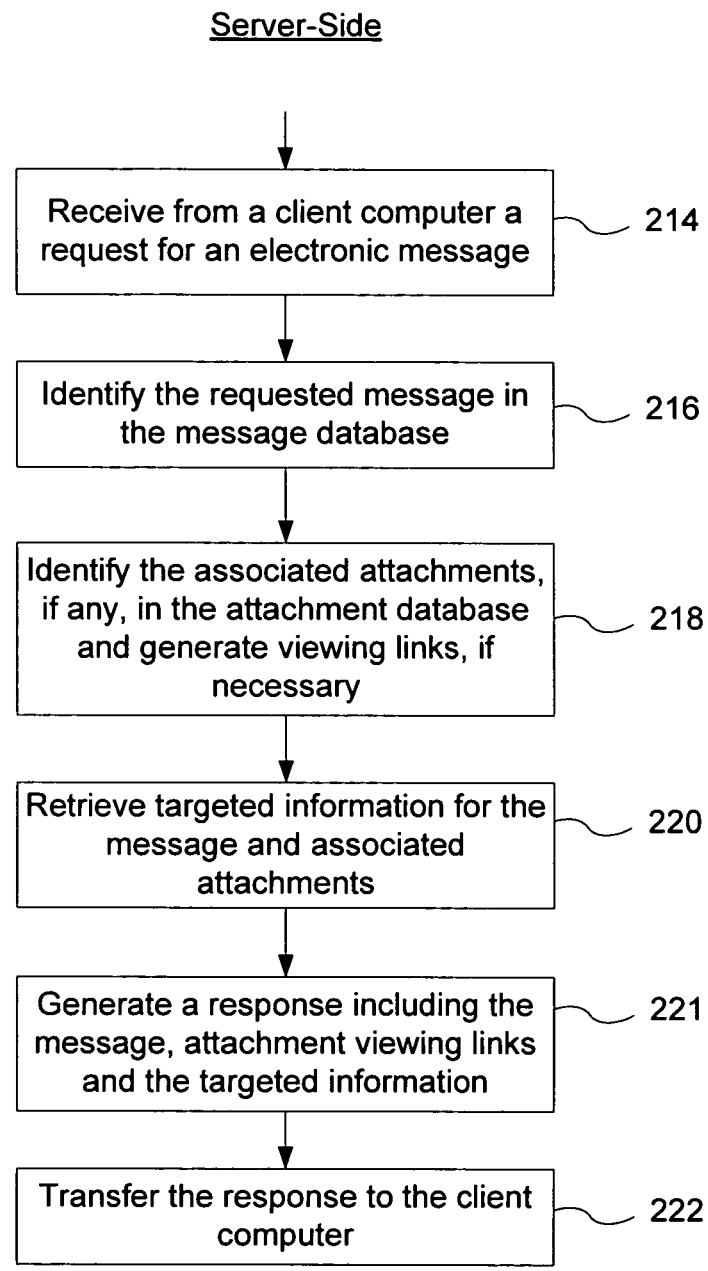
FIG. 2B is a flow diagram of a process of identifying an electronic message and preparing a corresponding response upon receipt of a client request for the electronic message in accordance with some embodiments of the present invention.

FIG. 2A is a flow diagram of a process of parsing and indexing an incoming electronic message and its associated attachments in accordance with some embodiments of the present invention. After receiving an incoming message having one or more attachments (202), the email service 106 parses the message into multiple message parts (204). For example, the message may be divided into a message header, a message body and one or more attachments. If the message has any attachments that the document converter 127 is capable of converting into an HTML file, the document converter 127 converts the content of those attachments into HTML files (206). Alternately, the document converter 127 may convert the files into XML files, or files encoded using any other suitable markup language. For ease of explanation, we will assume that the markup language used by the document converter 127 is HTML.

Some message attachments are not converted by the document converter 127. In some embodiments, these attachments that are not converted include image attachments, attachments whose document type is unknown or not recognized by the email server, attachments that can viewed using a conventional web browser without conversion, and attachments for which the document converter 127 does not have a conversion program or process. In some embodiments, the set of documents that are not converted at 206 furthermore includes any documents that the email system's indexer (which forms part of the updater engine 112) is capable of parsing and indexing in its native format. For instance, if the email system's indexer can parse and index files used by a particular word processing program, those files are not converted to HTML at 206.

In practice, the email system 106 stores or accesses a first list of file types (which may include data types as well) of attachments that are to be converted into HTML files by the document converter 127 at 206. Any attachment whose file or data type is not found on the first list is not converted by the document converter 127. In some embodiments, the email system also stores (or has access to) a second list of file types (which may include data types as well) of attachments that the document converter 127 is capable of converting into HTML files. The second list of file types may include one or more file types that are not included in the first list. For example, the second list of file types may include a file type associated with files that the indexer (in updater engine 112) is capable of parsing and indexing in their native format. While the first and second lists of file types may be the same in some embodiments, in other embodiments the second list contains more file types than the first list. In some embodiments, the first and second file lists are stored in a single data structure, along with information (e.g., a flag value) to indicate which of the listed file types belong to the first list, and which do not.

Next, the email service 106 selects a message part, or its corresponding converted HTML file (208), and indexes the selected message part or HTML file (210). The indexing result is stored in the message index 114. The selecting and indexing operations are repeated until all parts of the message have been processed. In addition, the email service 106 stores the message in the message database 118 and the attachments in the attachment database 119 (213). In some embodiments, the converted HTML files are also stored in a database for future use. However, in some other embodiments, the email service 106 discards the converted HTML files after indexing them at 210. In this case, an attachment requested by a client will be converted into an HTML file on the fly, as described below.

In some embodiments, document conversion operation 206 is performed as part of the message part processing loop 208-210. In particular, as each message part is selected (208), if the message part is an attachment whose file or data type is a member of the aforementioned list of file types to be converted, the attachment is converted into an HTML (or other markup language) file prior to performing the indexing operation 210. If the message part is an attachment whose file or data type does not match the list of file types to be converted, the message part is indexed only if the indexer is capable of parsing and indexing message part in its native format. For some attachment types, the indexer may index only the file name, or the file name and predefined types of metadata (e.g., image titles).

The message parsing and indexing process shown in FIG. 2 occurs when the email service 106 receives a new incoming message directed to the user. When a user submits a message accessing request, the email service 106 identifies the requested message and prepares a response to the requesting user. FIG. 2B is a flow diagram of a process of identifying an electronic message and preparing a corresponding response upon receipt of a client request for the electronic message in accordance with some embodiments of the present invention.

Initially, the email service 106 receives from a client computer a request for a message (214). The email service 106 identifies the requested message in the message database 118 (216). In some embodiments, the identified message has an attachment identifier for each associated attachment. The email service 106 then identifies the associated attachments in the attachment database 119 using the attachment identifiers (218). For each attachment, the email service 106 determines if the attachment has a file type that can be converted into an HTML file by the document converter 127. In some embodiments, this determination is made by determining if the attachment's file type matches (e.g., is found in) the aforementioned second list of file types. If an attachment has a file type that can be converted by the document converter, the email service generates an attachment viewing link for the corresponding attachment. The attachment viewing link, if selected or otherwise activated by the user, causes a converted version of the attachment to be downloaded to the user's client device for viewing in a browser window or instance. Furthermore, the user is able to obtain a "quick view" of the associated attachment without downloading the attachment in its native format. More information about this process is provided below in connection with FIGS. 2C and 2D. As noted above, in some embodiments, the email system 106 or the document converter 127 includes a predefined set of HTML-convertible document types (e.g., in the form of file extensions). This predefined set of HTML-convertible document types may be stored in the form of a list or other data structure. If a respective attachment does not have a matching file extension, the email service 106 does not generate an attachment viewing link for the attachment.

Since the identified message and its associated attachments have been parsed and indexed previously (FIG. 2A), the email service 106 can invoke the targeted information processor 124 to retrieve targeted information from information item server 130 and ad server 128 (220). For example, if one of the attachments to a message includes a package shipment tracking number, the targeted information processor 124 may retrieve information about the current shipment status from an information item server. Next, the email service 106 generates a response to the client request (221). This response includes the requested message, links for downloading each of the message's attachments, attachment viewing links for each of the HTML-convertible attachments (if any), and targeted information items (if any were identified at 220). The response is then transferred to the requesting client computer (222).

Figure 2C:
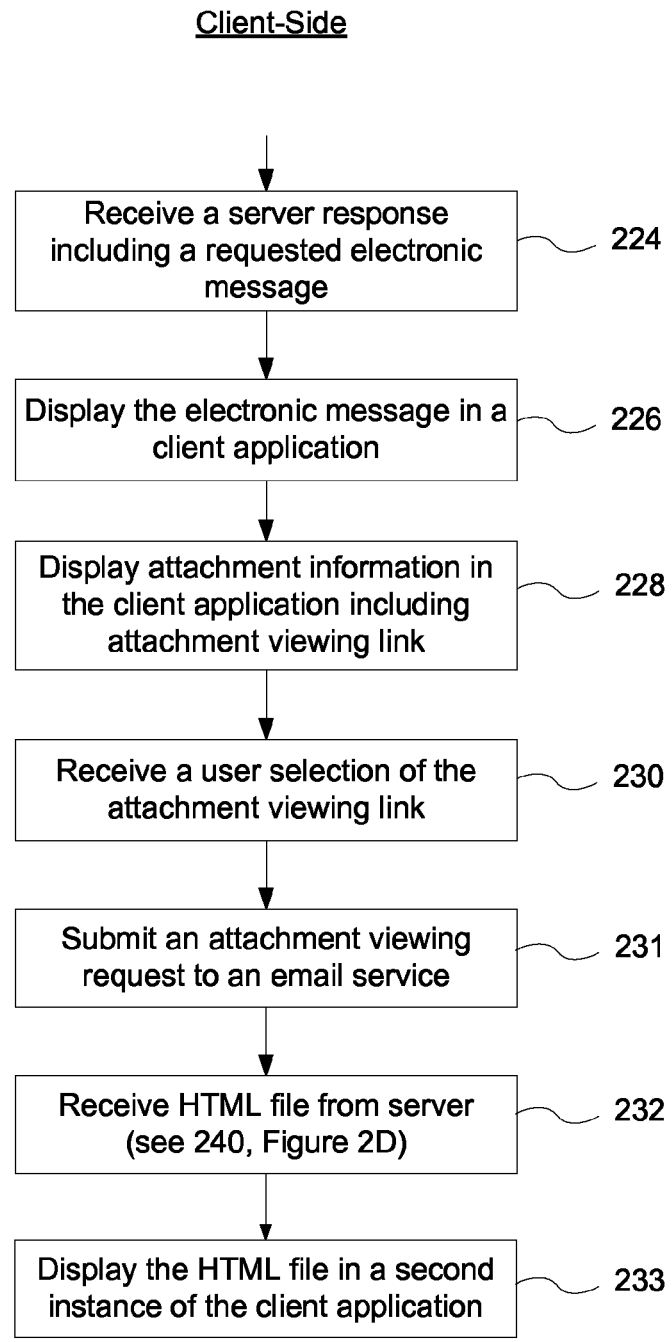
FIG. 2C is a flow diagram of a process of displaying an electronic message including its associated attachment viewing links to a client user and capturing the user's subsequent requests in accordance with some embodiments of the present invention.

FIG. 2C is a flow diagram of a process at a client computer after receiving a server response from the email service 106 in accordance with some embodiments of the present invention. Upon receipt of the server response (224), the client computer displays the requested message in a client application 132 (e.g., a web browser) to allow the user to view the message (226). Depending on whether the message has any attachments, the client application 132 may also display attachment information (228). In some embodiments, the attachment information includes a document name (sometimes called the attachment name) and an attachment downloading link for each attachment. As described above, in some embodiments the attachment information also includes a document type icon and a document size for each attachment, in addition to the document name and attachment downloading link. An attachment viewing link may be displayed next to the attachment downloading link if the attachment was deemed to be HTML-convertible by the email service 106.

Upon receiving or viewing the message, the user may want to view the content of an attachment without downloading the attachment itself. For example, if the client computer does not have an installed application program corresponding to the file type of the attachment, the user may be unable to open the attachment for viewing after downloading it to the client computer. In certain cases, the user may be only interested in the textual portion of an attachment, and therefore may not need the attachment to be rendered by an application program corresponding to the attachment's file type. Using a PowerPoint (trademark of Microsoft) presentation file as an example of an attachment, the user may be only interested in determining the topic discussed in the attachment, and therefore may not need to see a full rendering of presentation. Regardless of the user's reason for wanting to view an attachment without opening it using a corresponding application program, the attachment viewing link provides an easy, convenient alternative to downloading the attachment and opening it using an application program. The user can simply select an attachment viewing link to view an HTML version of the attachment. In response to the user selection (230), the client application 132 or the client assistant 134 submits an attachment viewing request to the email service 106 (231).

Figure 2D:
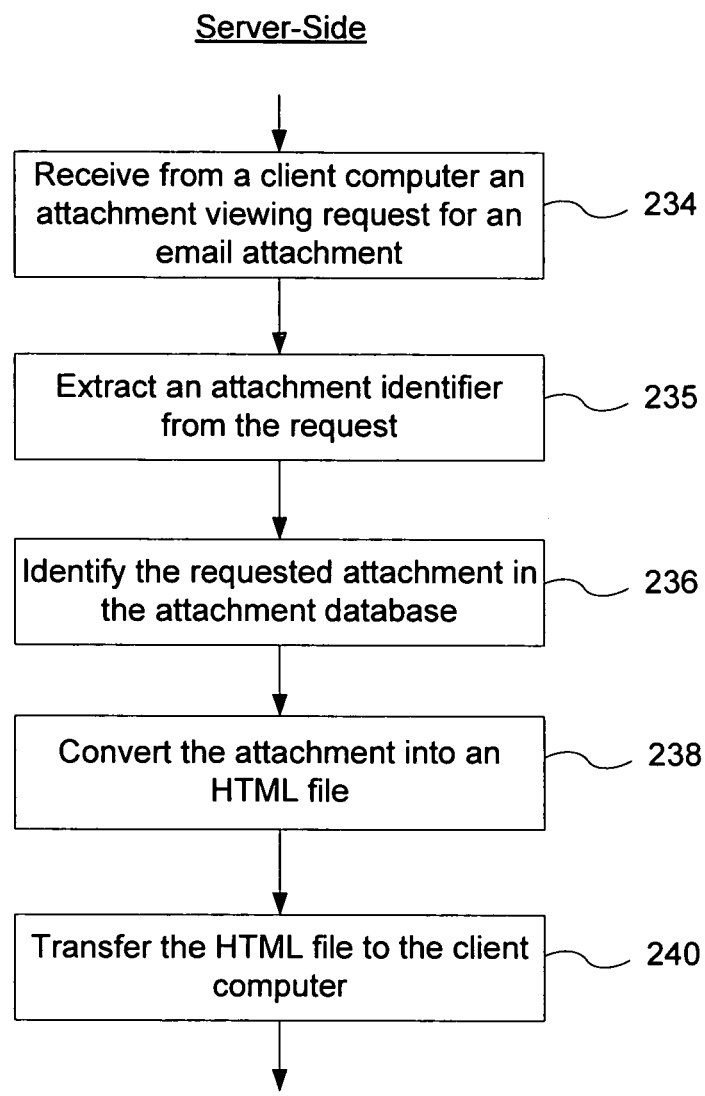
FIG. 2D is a flow diagram of a process of converting a client-specified attachment into an HTML file and serving the HTML file to the requesting client in accordance with some embodiments of the present invention.

FIG. 2D is a flow diagram of a process, performed by the email service 106, in response to receiving an attachment viewing request in accordance with some embodiments of the present invention. From the attachment viewing request (234), the email service 106 extracts an attachment identifier (235). Using the attachment identifier, the email service 106 identifies the requested attachment in the attachment database 119 (236). The requested attachment is then submitted to the document converter 127 to be converted into an HTML file (238). The email service 106 then transfers the HTML file back to the client computer as a response to the attachment viewing request (240).

However, if the file was previously converted into an HTML file at 206 (FIG. 2A), and the previously-generated HTML file has been saved by the email service 106, operation 238 is replaced by retrieval of the previously-generated HTML file, thereby allowing the request to be processed more quickly than if the attachment is converted into an HTML file in response to the request. This speed up in response requires additional storage space in the email service 106 for storing the previously-generated HTML files. In some embodiments, the email service 106 may adopt a hybrid approach by saving only the HTML files of those attachments that have met predetermined criteria, e.g., attachments whose senders are in a predefined list, or attachments having one of a predefined set of document types, or the attachments of messages received by the email service less than M days or hours ago, where M is a predefined value. In the latter example, HTML files produced by converting the attachments of received messages are initially stored by the email server 106, and are then deleted when the age of the message, as measured from the time of receipt of the message, exceeds a predefined threshold.

The operation on the client side (see FIG. 2C) is relatively straightforward. Following a user selection of the attachment viewing link (FIG. 2C, 230), a corresponding request is sent by the client device to the email service 106 (FIG. 2C, 231). When the response to the request is received, the response includes an HTML file or document if FIG. 2C, 232). The client device opens a new instance of the client application (e.g., a new web browser window) and renders the received HTML file or document (i.e., the HTML-converted attachment) in the new instance of the client application (FIG. 2C, 233).

Figure 3A:
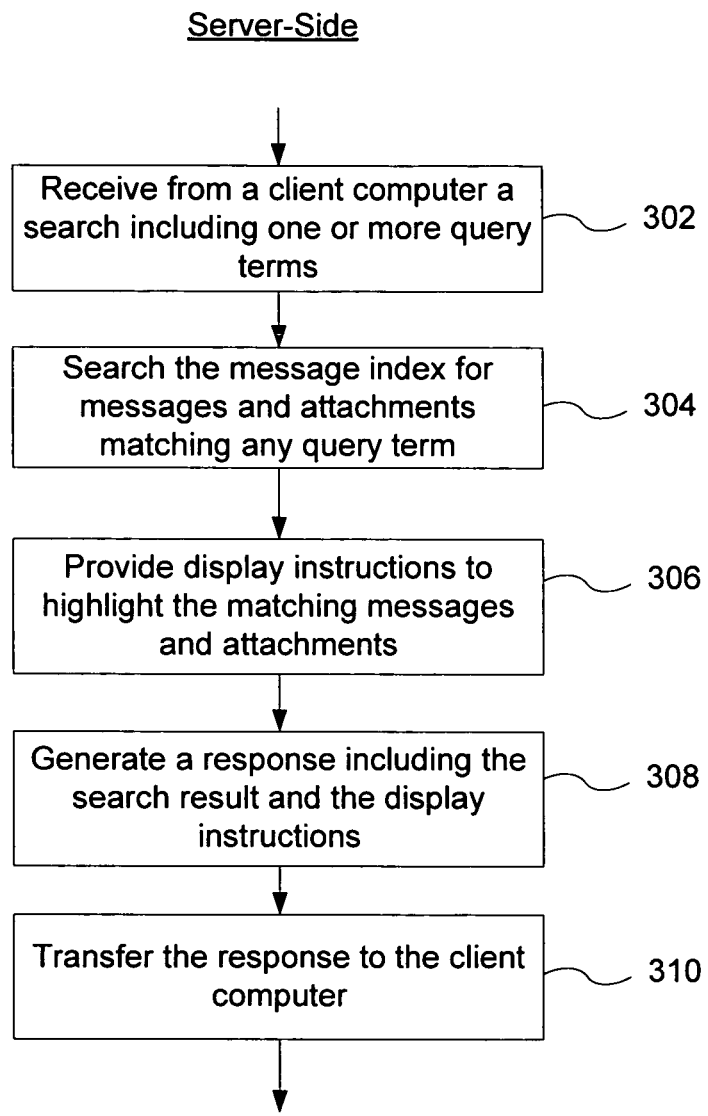
FIG. 3A is a flow diagram of a process of identifying matching messages including attachments and preparing a corresponding response upon receipt of a search from a client in accordance with some embodiments of the present invention.
Figure 3B:
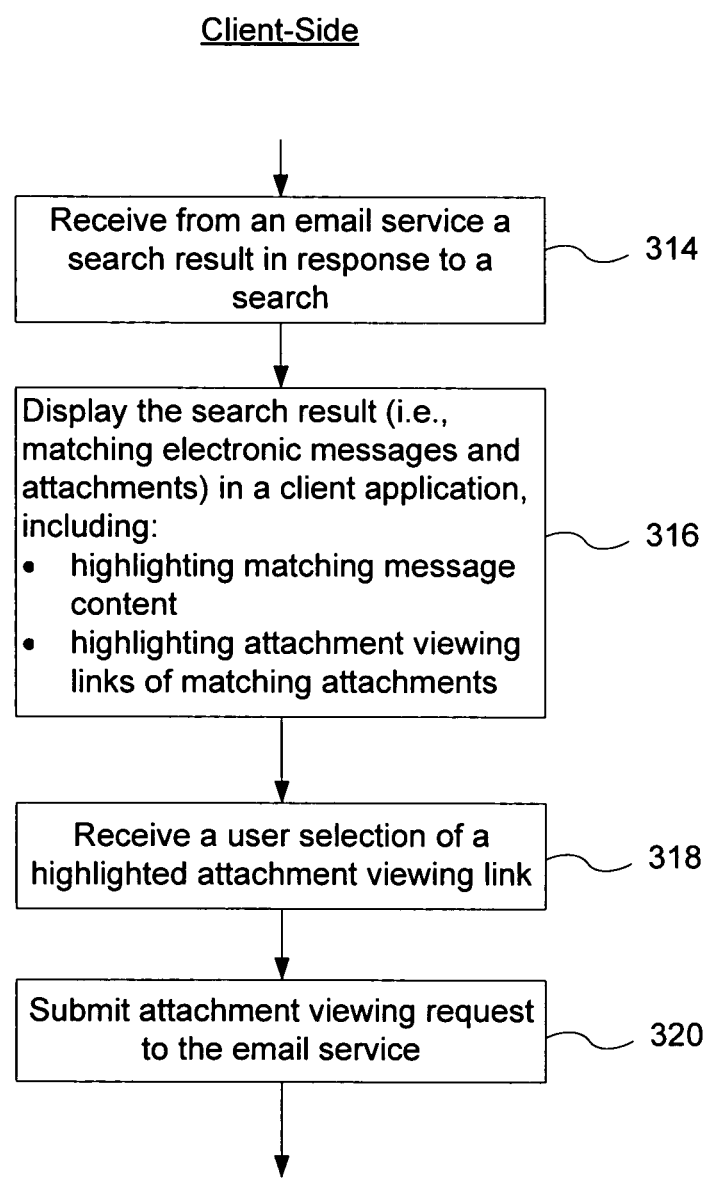
FIG. 3B is a flow diagram of a process of displaying electronic messages matching a search in a predefined manner and capturing the user's subsequent requests in accordance with some embodiments of the present invention.
Figure 3C:
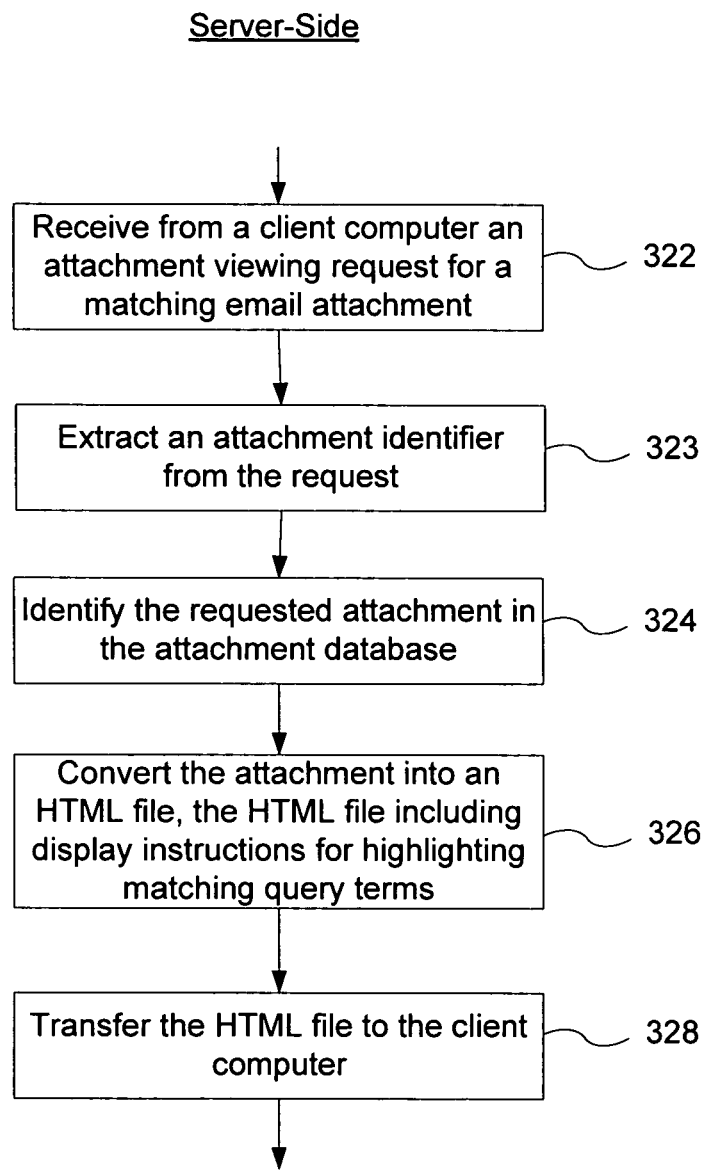
FIG. 3C is a flow diagram of a process of converting a client-specified attachment into an HTML file and serving the HTML file to the requesting client in accordance with some embodiments of the present invention.

Besides reading new messages, a user often searches old messages in his or her user account for information of interest. Parsing and indexing message attachments, thereby making the content of the attachments available for searching, greatly expands the utility of user searches for information of interest. In some embodiments, a user can limit the search range for a particular search to include message attachments, but to exclude message bodies. In some embodiments, a user can limit the search range for a particular search to include message bodies, but to exclude message attachments. In some embodiments, a user can set the search range for a particular search to include both message bodies and message attachments FIGS. 3A-3C depict the processes of searching and displaying both message bodies and attachments for information matching a query term. FIG. 3A is a flow diagram of a process of identifying matching messages, including messages having attachments that match a search query, and preparing a response upon receipt of a search from a client in accordance with some embodiments of the present invention. Initially, the email service 106 receives from a client computer a search query including one or more query terms (302). Using the query terms, the email service 106 searches its message index 114 for messages and associated attachments that match any of the query terms (304). The search result may comprise three types of messages: (i) messages whose message body includes matching content (i.e., content that satisfies the search query, for example by matching one or more of the query terms); (ii) messages whose attachment(s) includes matching content; and (iii) messages whose message body and one or more attachments both include matching content (e.g., content in the message body matches or corresponds to at least one portion of a search query while content in an attachment matches or corresponds to at least another portion of the search query).

Next, the email service 106 provides display instructions to highlight the matching content in the identified messages and/or attachments (306). A search result including a single message or multiple messages associated with a single conversation is to be displayed in a conversation view. The matching content in the message body may be highlighted (i.e., formatted for display in a visually distinctive manner, compared to other content in the message body). For example, the matching content in the message body may be formatted for display using boldface characters and a distinctive background color. Note that there are many other highlighting schemes that can be employed to make the matching content look more prominent. In some embodiments, if the matching content is found in an attachment associated with a message, the corresponding document name of the attachment is highlighted. Optionally, the attachment viewing link of the attachment may also be highlighted. Highlighting an attachment's document name and/or attachment viewing link effectively notifies the user that the attachment contains content matching the query used to identify the message.

A search result including multiple messages associated with more than one conversation is displayed in a conversation list view. Each conversation may have a snippet. The snippet may include highlighted matching content in the message body. If the matching content is found in the attachment, the snippet may include the highlighted attachment document name, the highlighted attachment viewing link, highlighted matching content in the attachment, or a combination of two or more of these. After the user clicks on one of the conversations, the conversation list view will be replaced by a conversation view including the highlighted matching content as described above.

At the end, the email service 106 generates a response including the search result and the associated display instructions (308) and transfers the response to the requesting client computer for display (310).

FIG. 3B is a flow diagram illustrating a process of displaying the search result in a predefined manner on a client computer or device and capturing the user's subsequent requests in accordance with some embodiments of the present invention. Upon receipt of a search result (314), the client computer displays it in a client application (e.g., a web browser) in accordance with the display instructions accompanying the search result (316). The search result includes information from one or more matching messages, which are messages that match a search query. For purposes of this discussion, "matching messages" may include messages having one or more attachments that match a search query. As noted above, the display instructions accompanying the search result may include instructions for highlighting message content matching the search query. The display instructions may also include instructions for highlighting the document name and/or attachment viewing link of any message attachments that match the search query. The matching messages may be displayed in a conversation list view or a conversation view depending on the number of unique conversations in the search result. If the user is interested in viewing an attachment of a message, the user may click on the highlighted attachment viewing link (318). In response, the client application 132 or the client assistant 134 submits an attachment viewing request to the email service 106 (320).

FIG. 3C is a flow diagram of a process at the email service 106 of converting a client-specified attachment into an HTML file in a predefined manner and then serving the HTML file to the requesting client in accordance with some embodiments of the present invention. From the attachment viewing request (322), the email service 106 extracts an attachment identifier (323). Using the attachment identifier, the email service 106 identifies the matching attachment in the attachment database 119 (324). The attachment and the matching query term(s) are then sent to the document converter 127. The document converter 127 converts the attachment into an HTML file (326), herein called the "converted HTML file." The converted HTML file includes (or is modified to include) display instructions to highlight the matching query term(s). The converted HTML file is then sent back to the client computer for display (328).

Figure 4A:
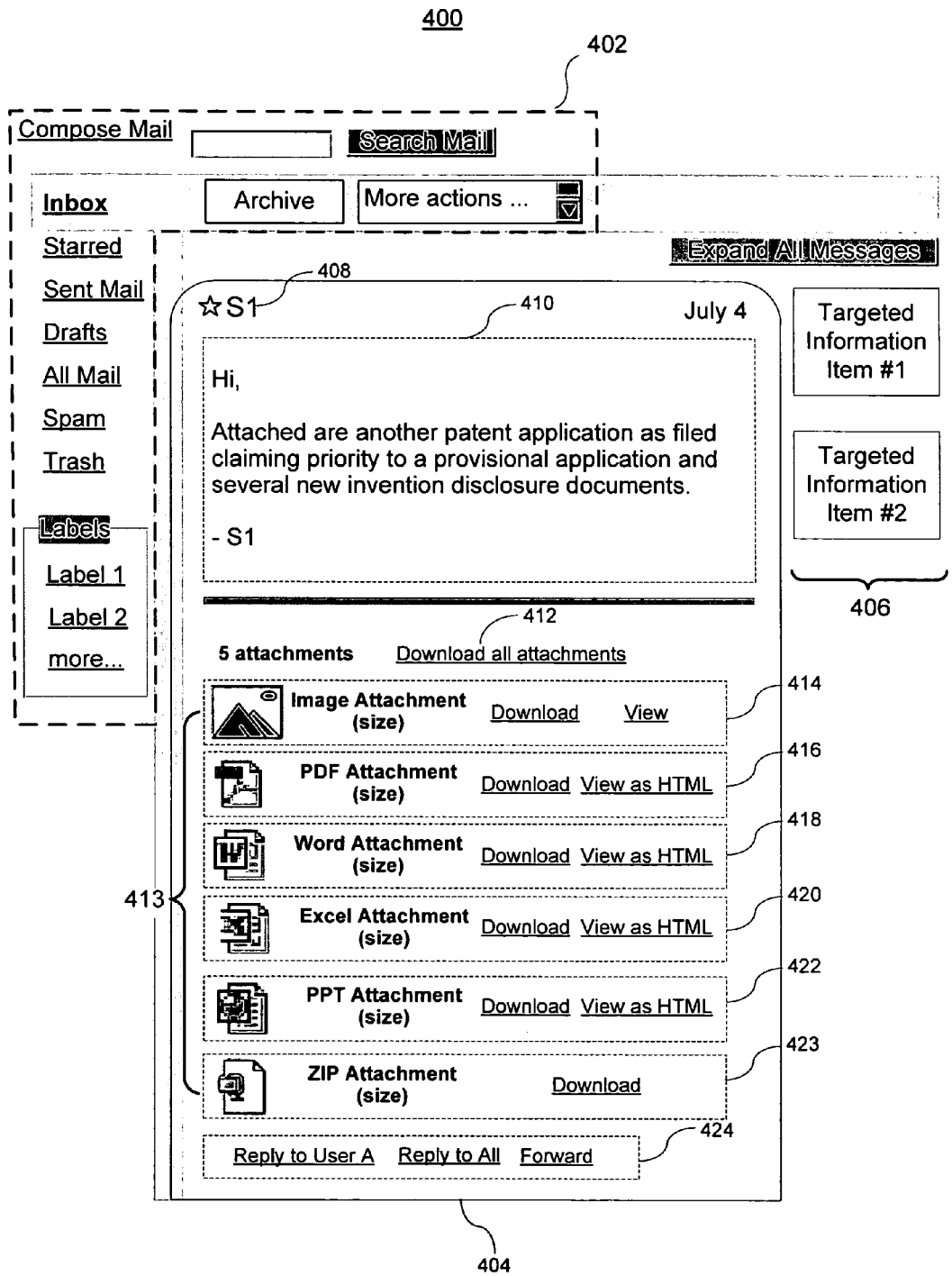
FIG. 4A illustrates an exemplary schematic screenshot of an electronic message in a client application including multiple attachment viewing links in accordance with some embodiments of the present invention.
Figure 4B:
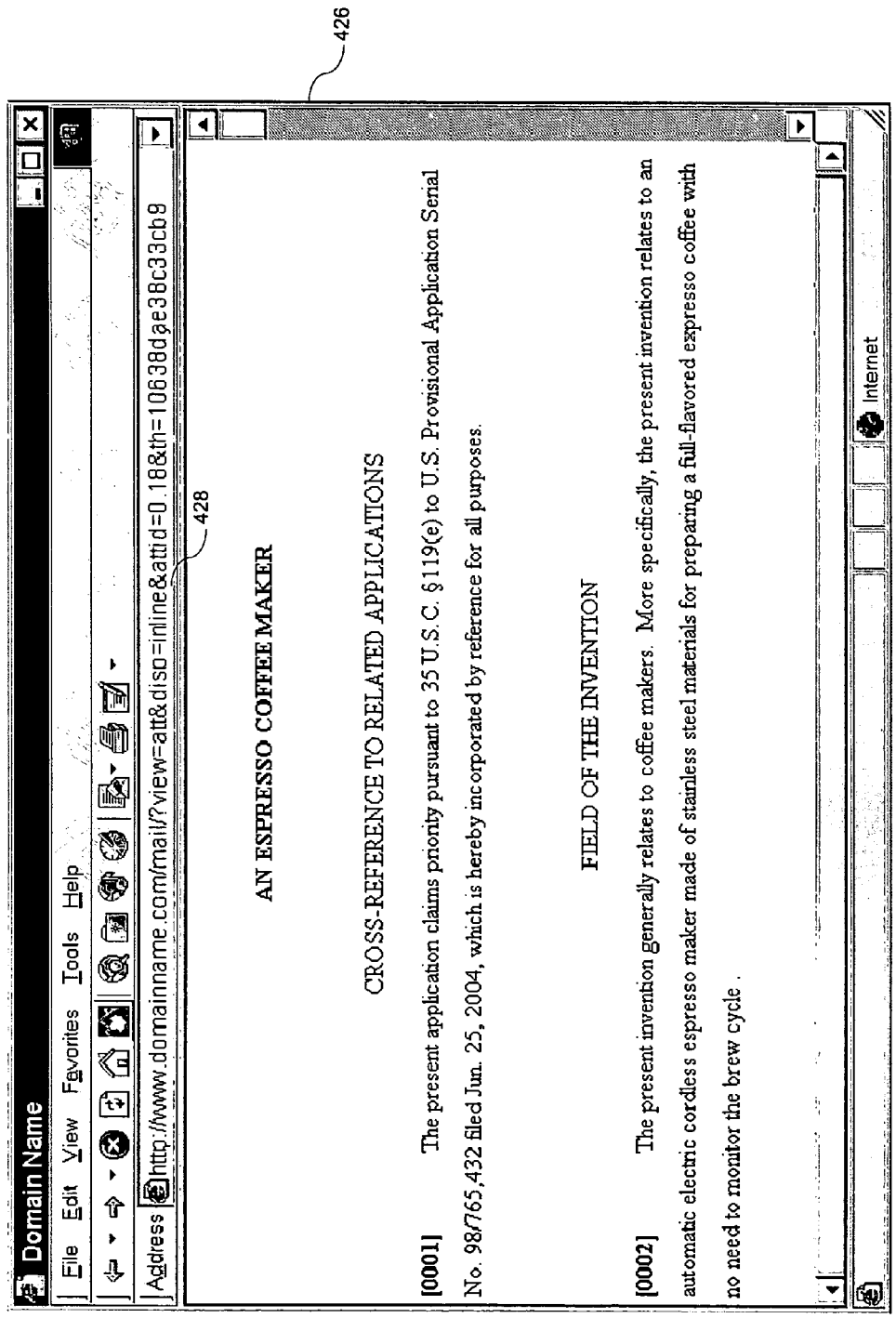
FIG. 4B illustrates an exemplary schematic screenshot of a portable document format (PDF) file viewed as an HTML file in a web browser window in accordance with some embodiments of the present invention.

To better illustrate the present invention, FIGS. 4A and 4B are two exemplary schematic screenshots illustrating how the attachments are viewed as HTML files on a client computer.

FIG. 4A provides an exemplary, schematic screenshot of a display with a conversation, a message body including attachment information and targeted information items in accordance with some embodiments of the invention. FIG. 4A provides one exemplary display organization for illustrative purposes only and does not serve to limit the ways that conversations, attachment information and targeted information items can be displayed. The display area 400 includes three major display portions: a navigation and control portion 402, a message portion 404, and a targeted information item portion 406. The navigation and control portion 402 can include one or more navigation and/or control items (e.g., "Compose Mail" and "Search Mail", etc.). The targeted information item portion 406 can include one or more information items which have been obtained by the targeted information processor 124. FIG. 4A illustrates only one exemplary layout configuration and other layouts are possible. For example, the relative position of the display areas to each other may change (e.g., the targeted information item portion 406 can be displayed to the left, right, above or below the message portion 404).

The message portion 404 may include a conversation description and one or more messages associated with a conversation. The conversation view in FIG. 4A includes only one message. The message was sent by sender "S1" 408 to the user. The message body 410 indicates that the message has a set of attachments.

The attachment information is placed in the message portion 404, below the message body 410. The attachment information includes a "Download all attachments" link 412. The user can click on this link to download all the attachments associated with this message to a user-specified location on the client computer, e.g., in the form of a ZIP file. A six row table 413 contains attachment information associated with individual attachments. Row 414 corresponds to an image attachment. The user can click on one of the two links in this row to either download the image or view the image directly from a web browser window or a plug-in application program. Rows 416, 418, 420 and 422 correspond to attachments having different document types such as PDF, Word, Excel and PowerPoint (Word, Excel, and PowerPoint are trademarks of Microsoft). Each row includes a "View as HTML" link. When a user clicks on the view attachment link in a particular row, a new web browser window pops up displaying the corresponding attachment's content in the HTML format.

It should be noted that, when an attachment is displayed in a web browser window, the HTML-format display style may or may not be the same as that when the attachment is displayed by a native application program. A Word attachment or a PDF text attachment rendered in the web browser window may look substantially similar to the corresponding document rendered by Microsoft's Office or Adobe System's Acrobat. But a PowerPoint attachment rendered in the web browser window may look substantially dissimilar to the corresponding document rendered by Microsoft's Office, for instance because animations in the PowerPoint attachment are not replicated in the converted HTML document. In some embodiments, the converted HTML file includes only text extracted from the PowerPoint attachment and does not include any of the graphics, animations or templates of the attachment. This may apply to other types of files as well, such as other types of presentation files and motion picture files.

FIG. 4A shows that not all attachments have an associated "View as HTML" link. For example, the ZIP attachment 423 has a download link, but does not have a view link and does not have a "View as HTML" link. There are both practical and technical reasons behind this configuration. First, a ZIP file often includes multiple documents, and a primary purpose of attaching a ZIP file to a message is to allow the recipient of the message to efficiently download the multiple documents. Second, the multiple documents within a ZIP file may have different document types, some of which the document converter may not be able to convert into HTML files. In any case, converting multiple documents into a single HTML document may not make sense in many situations. Third, a ZIP file is sometimes very large, making conversion of the ZIP file expensive and lengthy.

Assuming that the user clicks on the "View as HTML" link in row 416, FIG. 4B illustrates an exemplary schematic screenshot of the PDF file viewed as an HTML file in a web browser window 426 in accordance with some embodiments of the present invention. The address field 428 of the web browser window 426 includes an exemplary attachment viewing request submitted from a client. The request includes multiple pairs of parameters and values. For example, the value of the parameter "view" is "att", indicating that the file to be viewed is an attachment. The value of the parameter "disp" is "inline", indicating that the attachment is to be displayed in a separate web browser window. One skilled in the art will find that the attachment viewing request in FIG. 4B is only for illustrative purposes. There are many other HTTP-based schemes that can achieve the same or similar result. If the user clicks on the "View as HTML" link in row 422, another web browser window may pop up displaying the HTML version of the corresponding PowerPoint presentation attachment. Unlike Microsoft Office, which renders a PPT document slide by slide, the web browser window includes the textual portion of the presentation. When the converted HTML file is too long to be viewed all at once in a browser window, the user may use the browser window's scroll bar to view the entire converted HTML file.

Figure 5A:
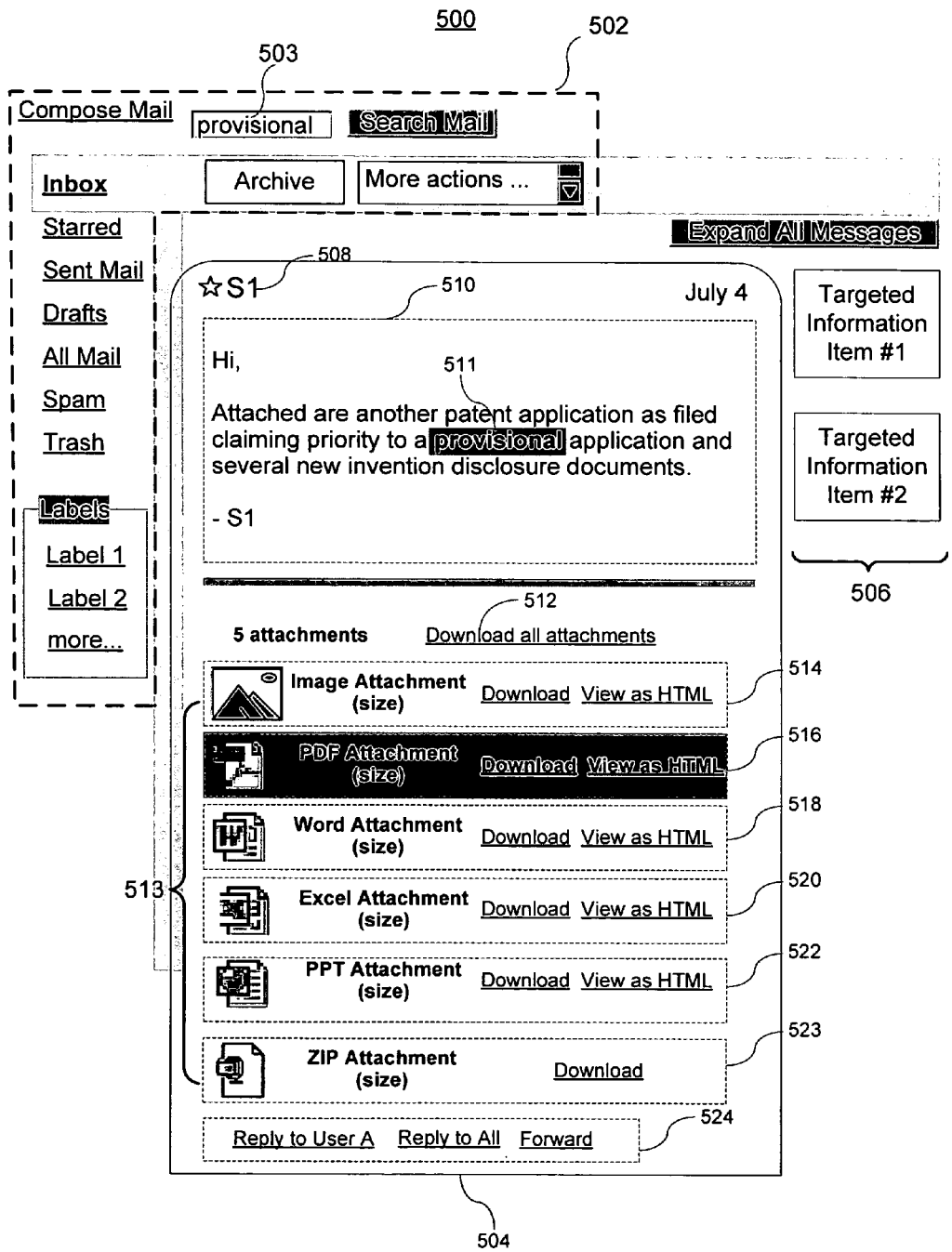
FIG. 5A illustrates an exemplary schematic screenshot of an electronic message in a client application including highlighted items matching a search in accordance with some embodiments of the present invention.
Figure 5B:
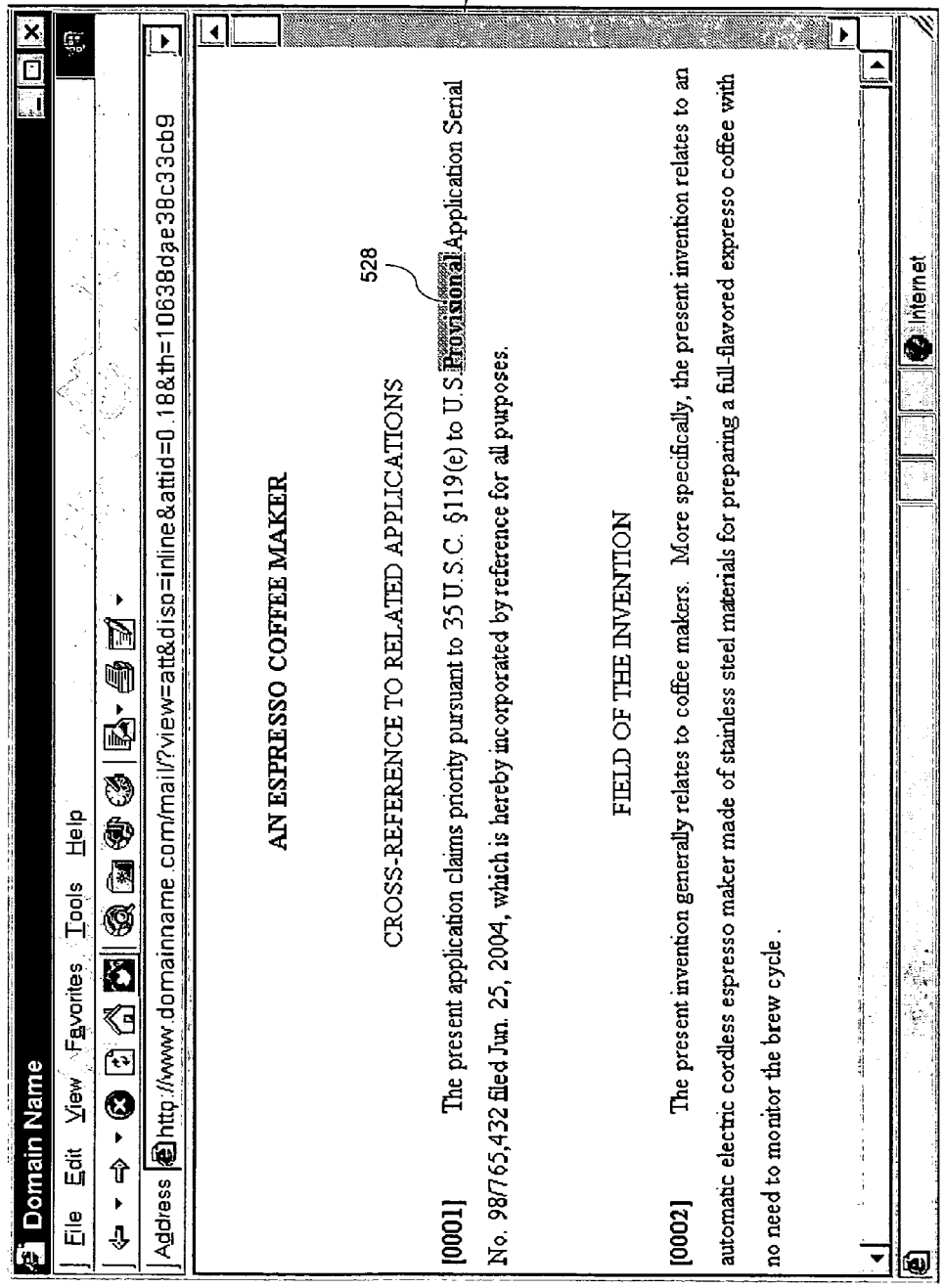
FIG. 5B illustrates an exemplary schematic screenshot of a PDF file viewed as an HTML file in a web browser window including highlighted items matching a search in accordance with some embodiments of the present invention.

FIG. 5A is similar to FIG. 4A except that it highlights all instances of a query term in the message body and the attachment information. In this example, the query term is "provisional" and there are two copies of the term "provisional" in the display area 500, one copy 511 in the message body 510 and the other copy in the PDF attachment in row 516. The term "provisional" in the message body 510 is highlighted, by use of a boldface font and a distinct background color. All text in the row 516 is highlighted, by use of a boldface font, and the entire region corresponding to the row 516 has a distinct background color. When the user clicks on the "View as HTML" link in row 516, an HTML converted version of the attachment identified by row 516 is displayed in a new browser window, as shown in FIG. 5B. FIG. 5B is similar to FIG. 4B, except that the instance of the query term "provisional" 528 in the message body has been highlighted.

Figure 6:
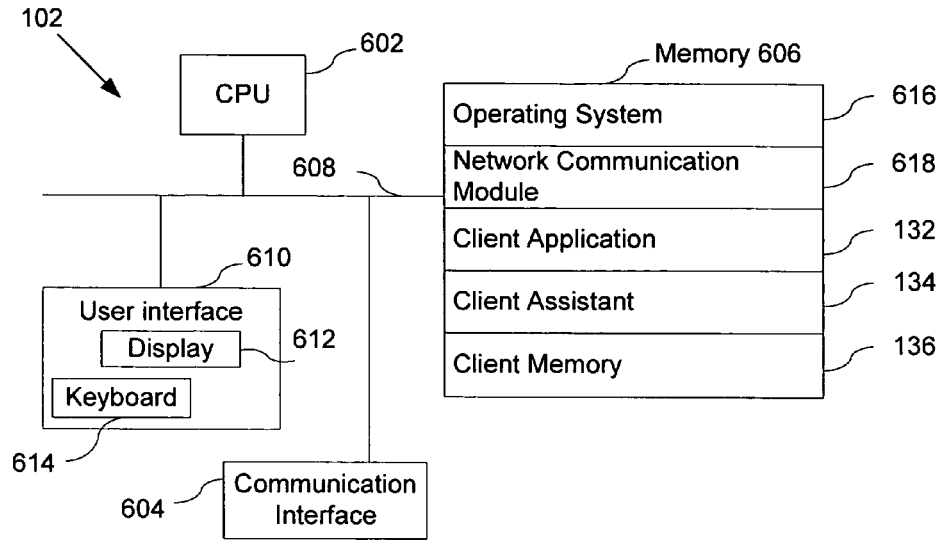
FIG. 6 is a block diagram of an exemplary client in accordance with some embodiments of the present invention.

FIG. 6 is a block diagram of an exemplary client in accordance with some embodiments of the present invention. The client 102 typically includes one or more processing units (CPUs) 602, one or more network or other communications interfaces 604, memory 606, and one or more communication buses 608 for interconnecting these components. The client 102 optionally may include a user interface 610 comprising a display device 612 and a keyboard 614. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 602. In some embodiments, memory 606 stores the following programs, modules and data structures, or a subset thereof:

- an operating system 616 that includes procedures for handling various basic system services and for performing hardware dependent tasks;
- a network communication module 618 that is used for connecting the client 102 to other computers via the one or more communication network interfaces 604 and one or more communication networks, such as the Internet, other wide area networks, local area networks, metropolitan area networks, and so on;
- a client application 132, such as a web browser, that enables a user to view messages and message attachments, as described above; and
- a client assistant 134 that can perform one or more tasks as described above.

Figure 7:
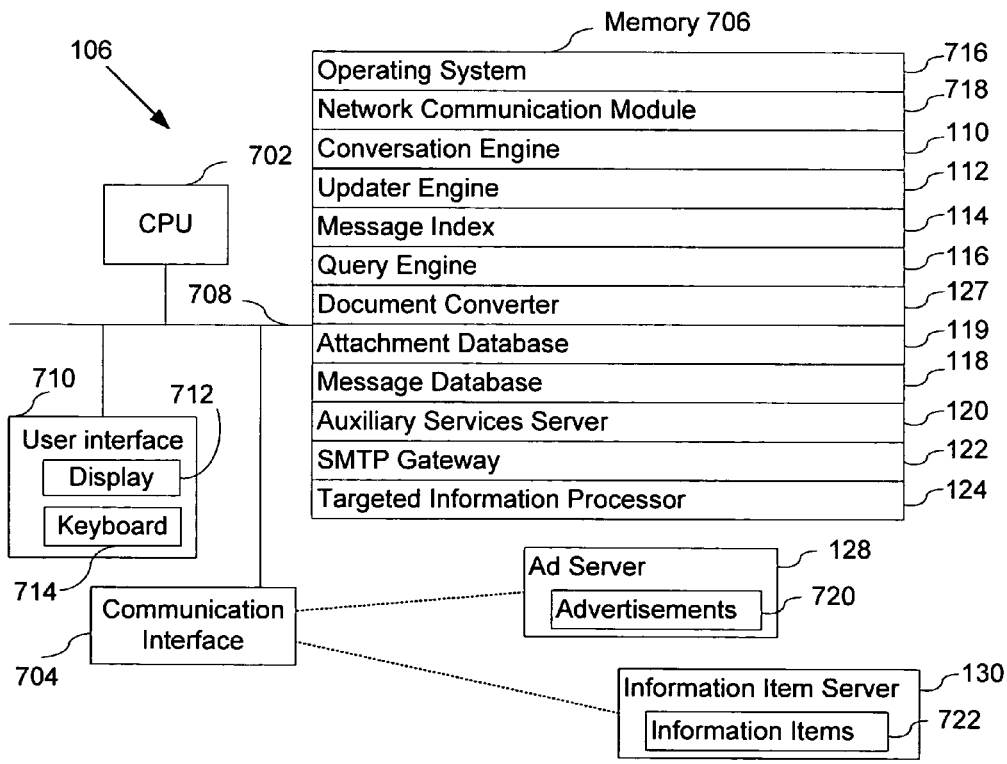
FIG. 7 is a block diagram of an exemplary email service in accordance with some embodiments of the present invention.

FIG. 7 is a block diagram of an exemplary email service 106 in accordance with some embodiments of the present invention. The email service 106 typically includes one or more processing units (CPUs) 702, one or more network or other communications interfaces 704, memory 706, and one or more communication buses 708 for interconnecting these components. The email service 106 optionally may include a user interface 710 comprising a display device 712 and a keyboard 714. Memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706 may optionally include one or more storage devices remotely located from the CPU(s) 702. In some embodiments, memory 706 stores the following programs, modules and data structures, or a subset thereof:

- an operating system 716 that includes procedures for handling various basic system services and for performing hardware dependent tasks;
- a network communication module 718 that is used for connecting the email service 106 to other computers via the one or more communication network interfaces 704 and one or more communication networks, such as the Internet, other wide area networks, local area networks, metropolitan area networks, and so on; and
- optionally, a targeted information processor 124 for obtaining targeted information for one or more identified messages as described above.

In some embodiments, the email service 106 includes the following elements, or a subset or superset of such elements: a conversation engine 110 for responding to a variety of requests from the client assistant 134 returning conversation-based responses; an updater engine 112 for updating a message database 118 and an attachment database 119; a message index 114 containing index information for messages in the message database 118 and attachments in the attachment database 119; a query engine 116 for searching the message database 118 and attachment database 119 using the message index 114; an auxiliary services server 120 for performing various auxiliary services; and an SMTP gateway 122 for sending and receiving messages including associated attachments.

The email service 106 can be connected to ad server 128 and/or information item server 130 via the communication interface 704. Ad server 128 can contain one or more advertisements 720. The ad server 128 can receive input and return advertisements that can be relevant to the input. The information item server 130 can include one or more information items 722. Similar to the ad server 128, the information server 130 can receive input and return informational items that can be relevant to the input.

Each of the above identified software elements in FIGS. 6 and 7 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 606 may store a subset of the modules and data structures identified above. Furthermore, memory 606 (FIG. 6) may store additional modules and data structures not described above. Similarly, memory 706 (FIG. 7) may store a subset of the modules and data structures identified above, and furthermore, memory 706 may store additional modules and data structures not described above.

Although FIGS. 6 and 7 show respectively a client 102 and an email service 106, the figures are intended more as functional descriptions of the various features which may be present in a client and set of servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement an email service 106 and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of displaying attachments associated with an electronic message, comprising:
on a client system:
displaying an electronic message in a first instance of a client application, the electronic message including a first attachment viewing link corresponding to a first attachment associated with the electronic message; the first attachment having a document type; and
in response to a single user action consisting of selection of the first attachment viewing link:
obtaining, from a document storage system, a first converted document corresponding to the first attachment, wherein the first converted document is converted in response to the single user action and has a document type different from the document type of the first attachment; and
displaying the first converted document in a second instance of the client application.

2. The method of claim 1, wherein the electronic message includes a second attachment viewing link corresponding to a second attachment associated with the electronic message, the second attachment having a document type, and said method further comprising:
in response to a single user selection of the second attachment viewing link, obtaining from the document storage system a second converted document corresponding to the second attachment, wherein the second converted document has a document type different from the document type of the second attachment; and
displaying the second converted document in a third instance of the client application.

3. The method of claim 2, wherein the document type of the first converted document is the same as the document type of the second converted document.

4. The method of claim 2, wherein the first and second converted documents are HTML files.

5. The method of claim 2, wherein the first and second attachments have document types selected from the set consisting of a word processing document type, a spreadsheet document type, a presentation document type, and a portable document type.

6. The method of claim 2, wherein the document type of the first attachment is different from the document type of the second attachment.

7. The method of claim 1, further comprising displaying the first converted document in a manner similar to a manner in which the first attachment is displayed by its associated native application program.

8. The method of claim 1, further comprising displaying the first converted document in a manner dissimilar from a manner in which the first attachment is displayed by its associated native application program.

9. A method of displaying attachments associated with an electronic message, comprising:
on a client system:
displaying an electronic message in a first instance of a client application, the electronic message including a first attachment viewing link corresponding to a first attachment associated with the electronic message; the first attachment having a document type; and
in response to a single user action consisting of selection of the first attachment viewing link:
obtaining, from a document storage system, a first converted document corresponding to the first attachment, wherein the first converted document has a document type different from the document type of the first attachment; and
displaying the first converted document in a second instance of the client application;
further comprising highlighting the first attachment viewing link if the first attachment includes content matching at least one user specified query term.

10. The method of claim 9, further comprising highlighting the matching content in the first converted document displayed in the second instance of the client application.

11. The method of claim 9, further comprising displaying the highlighted first attachment viewing link and/or the matching content in a snippet associated with the electronic message when displaying the electronic message and the associated snippet as a search result in response to the user specified query term.

12. A method of supplying converted documents to a client computer, comprising:
at a server system:
sending to the client computer an electronic message the electronic message including an attachment viewing link corresponding to an attachment associated with the electronic message; the attachment having a document type;

receiving an attachment viewing request corresponding to a single user action consisting of selection of the attachment viewing link; and in response to the attachment viewing request:
converting the attachment into a converted document, the converted document having a document type different from the document type of the attachment; and
transferring, to the client computer, the converted document.

13. The method of claim 12, wherein the converted document is an HTML file.

14. The method of claim 12, wherein the attachment has a document type selected from the set consisting of a word processing document type, a spreadsheet document type, a presentation document type, and a portable document type.

15. A method of supplying converted documents to a client computer, comprising:
at a server system:
sending to the client computer an electronic message the electronic message including an attachment viewing link corresponding to an attachment associated with the electronic message; the attachment having a document type;
receiving an attachment viewing request corresponding to a single user action consisting of selection of the attachment viewing link; and
in response to the attachment viewing request:
converting the attachment into a converted document, the converted document having a document type different from the document type of the attachment; and
transferring, to the client computer, the converted document;
wherein the electronic message further includes display instructions to the client computer for highlighting the attachment viewing link if the attachment includes content matching at least one query term in a search query.

16. The method of claim 15, wherein the converted document includes display instructions to the client computer for highlighting matching content in the converted document matching at least one query term in a search query.

17. A system for serving an electronic message and its associated attachments in response to client requests, comprising:
memory;
a processor; and
at least one program, stored in the memory and executed by the processor, the at least one program including:
instructions for generating an electronic message in response to a client request from a client computer, the electronic message including an attachment viewing link corresponding to an attachment associated with the electronic message; the attachment having a document type;
instructions for converting the attachment into a converted document in response to an attachment viewing request corresponding to a single user action consisting of selection of the attachment viewing link, the converted document having a document type different from the document type of the attachment; and
instructions for receiving the requests from the client computer and transferring the requested electronic message and the converted document to the client computer.

18. The system of claim 17, wherein the converted document is an HTML file.

19. The system of claim 17, wherein the attachment has a document type selected from the set consisting of a word processing document type, a spreadsheet document type, a presentation document type, and a portable document type.

20. A system for serving an electronic message and its associated attachments in response to client requests, comprising:
memory;
a processor; and
at least one program, stored in the memory and executed by the processor, the at least one program including:
instructions for generating an electronic message in response to a client request from a client computer, the electronic message including an attachment viewing link corresponding to an attachment associated with the electronic message; the attachment having a document type;
instructions for converting the attachment into a converted document in response to an attachment viewing request corresponding to a single user action consisting of selection of the attachment viewing link, the converted document having a document type different from the document type of the attachment; and
instructions for receiving the requests from the client computer and transferring the requested electronic message and the converted document to the client computer;
wherein the electronic message includes display instructions to the client computer for highlighting the attachment viewing link if the attachment includes content matching at least one query term in a search query.

21. The system of claim 20, wherein the converted document includes display instructions to the client computer for highlighting content in the converted document matching at least one query term in a search query.

22. A computer program product, for use with a computer system, the computer program product comprising a computer readable storage medium that stores:
instructions for generating an electronic message in response to a client request from a client computer, the electronic message including an attachment viewing link corresponding to an attachment associated with the electronic message; the attachment having a document type;
instructions for converting the attachment into a converted document in response to an attachment viewing request corresponding to a single user action consisting of selection of the attachment viewing link, the converted document having a document type different from the document type of the attachment; and
instructions for receiving the requests from the client computer and transferring the requested electronic message and the converted document to the client computer.

23. The computer program product of claim 22, wherein the converted document is an HTML file.

24. The computer program product of claim 22, wherein the attachment has a document type selected from the set consisting of a word processing document type, a spreadsheet document type, a presentation document type, and a portable document type.

25. A computer program product, for use with a computer system, the computer program product comprising a computer readable storage medium that stores:
instructions for generating an electronic message in response to a client request from a client computer, the electronic message including an attachment viewing link corresponding to an attachment associated with the electronic message; the attachment having a document type;

instructions for converting the attachment into a converted document in response to an attachment viewing request corresponding to a single user action consisting of selection of the attachment viewing link, the converted document having a document type different from the document type of the attachment; and instructions for receiving the requests from the client computer and transferring the requested electronic message and the converted document to the client computer;

wherein the electronic message includes display instructions to the client computer for highlighting the attachment viewing link if the attachment includes content matching at least one query term in a search query.

26. The computer program product of claim 25, wherein the converted document includes display instructions to the client computer for highlighting content in the converted document matching at least one query term in a search query.

27. The method of claim 1, wherein displaying the electronic message in the first instance of the client application includes concurrently displaying the first attachment viewing link and an attachment downloading link that is distinct from the first attachment viewing link.

28. The method of claim 12, wherein the electronic message includes an attachment downloading link that is distinct from the attachment viewing link.

29. The system of claim 17, wherein the electronic message includes an attachment downloading link that is distinct from the attachment viewing link.

30. The computer program product of claim 22, wherein the electronic message includes an attachment downloading link that is distinct from the attachment viewing link.

* * * * *